UNITED STATES PATENT OFFICE.

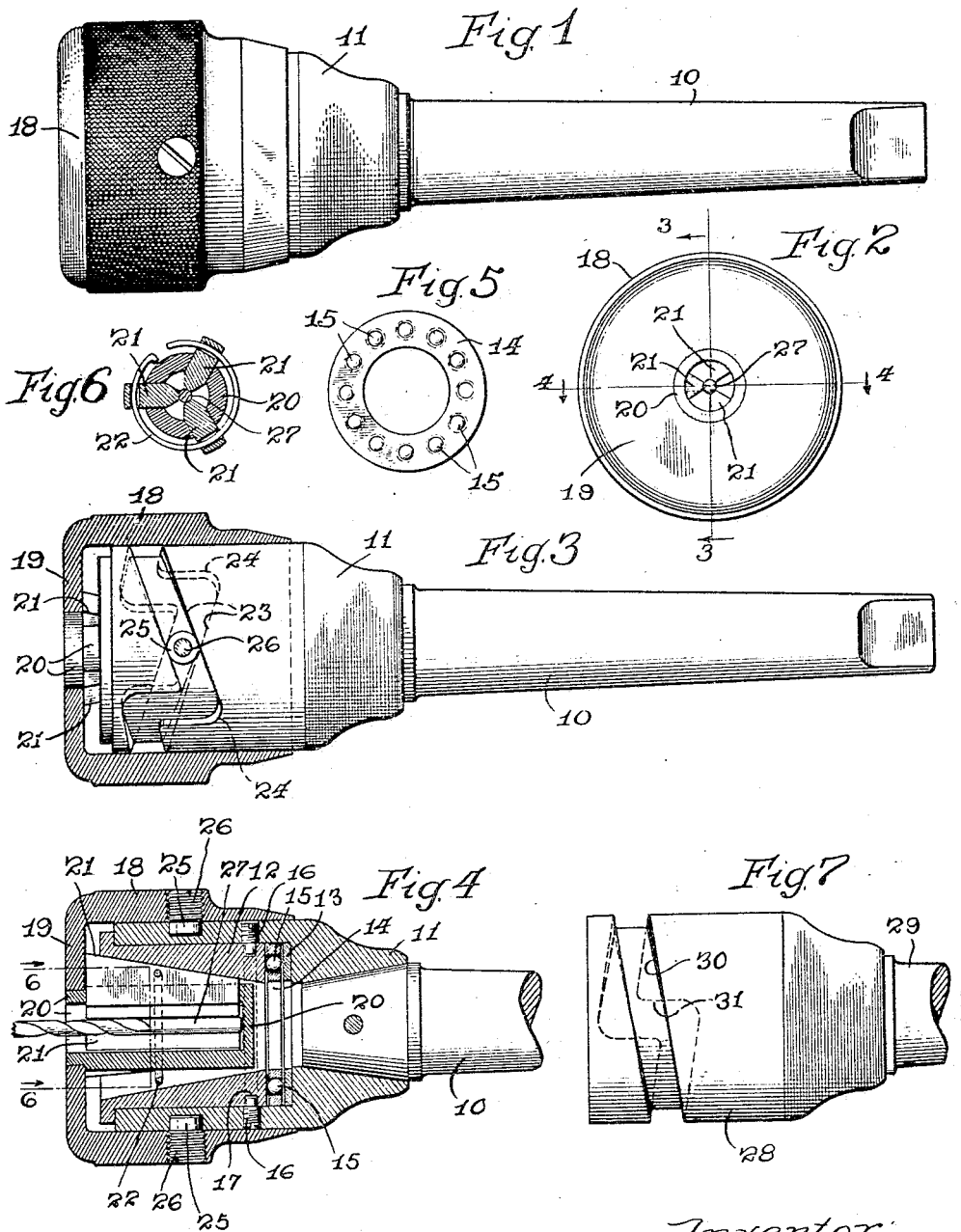

CARL A. PALMGREN, OF CHICAGO, ILLINOIS.

DRILL-CHUCK.

1,288,154.   Specification of Letters Patent.   Patented Dec. 17, 1918.

Application filed January 26, 1917.   Serial No. 144,719.

*To all whom it may concern:*

Be it known that I, CARL A. PALMGREN, a citizen of the United States, and a resident of Chicago, in the county of Cook and State of Illinois, have invented certain new and useful Improvements in Drill-Chucks, of which the following is a specification, reference being had to the accompanying drawings.

My invention relates to drill chucks, and has for its principal object the provision of a new and improved form and arrangement of means by the use of which a drill can be very firmly and very quickly locked in operative position therein. It is one of the specific objects of my invention to provide a quick-acting locking means by which a slight movement of a suitable adjusting device may be sufficient for throwing the clamping mechanism from its completely unlocked position to its completely locked position. It is another object of my invention to improve drill chucks in sundry details hereinafter pointed out. The preferred means by which I have accomplished my several objects are illustrated in the drawings and are hereinafter specifically described. That which I believe to be new and desire to cover by this application is set forth in the claims.

In the drawing—

Figure 1 is a side view of my improved chuck;

Fig. 2 is an end view as seen from the left in Fig. 1;

Fig. 3 is a transverse section through the chuck, being taken substantially on line 3—3 of Fig. 2;

Fig. 4 is a section taken substantially on line 4—4 of Fig. 2 at right angles to the section shown in Fig. 3;

Fig. 5 is a view of a member of a ball bearing employed in my improved chuck, illustrating the manner of holding the anti-friction devices in position;

Fig. 6 is a cross-section taken substantially on line 6—6 of Fig. 4;

Fig. 7 is a view showing a modified form of the head portion of my improved chuck.

Referring to Figs. 1 to 6, in which corresponding parts are indicated by the same reference characters,—

10 indicates the shank of my improved chuck, adapted to be inserted in the socket of an ordinary drill spindle. Fixedly mounted upon the end of the shank 10 is a cylindrical head 11 having a conical or tapered socket in its outer end to receive certain coacting members of the chuck, as hereinafter described. In the construction illustrated, the necessary taper of the socket is provided by employing a separable socket member 12 fitted in the outer end of the head 11, and preferably such socket member is revolubly mounted in the head with an anti-friction bearing mounted between the end of the socket member 12 and a suitable shoulder formed in the head 11. In the construction shown, the anti-friction bearing comprises a hardened bearing ring 13, and a ball spacing ring 14 provided with a plurality of balls 15 which are freely revoluble relative to the ring 14 but are preferably held against withdrawal therefrom. The socket member 12 is held in position by means of screws 16 mounted in the wall of the head 11 and engaging at their inner ends a circumferential groove 17 in the outer face of the socket member, as is best shown in Fig. 4.

An operating or grip sleeve 18 has a working fit about the head 11, such sleeve 18 being provided with an end flange 19 to which is fixedly secured a cage 20 extending into the socket member 12 in concentric position relative to the sleeve 18. The cage 20 is in the form of a cylinder provided with a plurality of longitudinally-extending slots in which are loosely mounted a plurality of jaws 21. In the construction shown, three of the jaws 21 are provided, spaced at equal distances about the periphery of the cage 20. The jaws 21 are held in position in the slots of the cage 20 by means of a suitable spring 22 passing through suitable openings in said jaws, as is best shown in Fig. 6, the spring 22 tending normally to hold the jaws in their outermost positions relative to the cage. By reason of the jaws 21 being of the same length as the slots in which they have a working fit, such jaws are movable longitudinally with the cage, as will be readily understood.

As is clearly indicated in Fig. 4, the inner face of the socket member 12 flares toward the outer end of said member. The result is that as the cage 20 and the jaws 21 carried thereby are moved toward the right in said Fig. 4, such jaws are moved inward toward each other against the action of the spring 22, the outer edges of the jaws 21 being so disposed as to hold the inner edges of said jaws in parallelism when the outer edges are in working engagement with the inner face of the socket member 12. As the cage 20 and the jaws 21 are moved to the left in Fig. 4, such jaws will be spread outward relative to each other by the action of the spring 22, such spring serving to press the jaws against the face of the socket member 12 with sufficient force to maintain the inner edges of the jaws in proper parallel position relative to each other. By an adjustment of the cage 20 longitudinally of itself so as to vary the position of the jaws with relation to the socket member 12, the space between the inner edges of the jaws can be varied as desired to cause such inner edges to have operative clamping engagement with drills of various sizes, as will be readily understood.

Means is provided for moving the cage 20 longitudinally of itself relative to the socket member 12. In the construction shown, this means comprises a cam groove 23 provided in the outer face of the head 11, as is best shown in Fig. 3, such cam groove, in the construction there shown, being formed in two duplicate circumferentially-extending sections on opposite sides of the head, joined by longitudinally-extending sections 24. The operating sleeve 18 is provided on its inner face with cam blocks or runners 25 which have a working fit in the cam groove 23, the blocks or runners 25, in the construction shown, being in the form of rollers mounted upon the inner ends of screws 26 carried by the sleeve 18. As will be readily understood, when the sleeve 18 is rotated relative to the head 11, the cam blocks 25 traveling in the cam groove 23 serve to move the sleeve 18 longitudinally of the head 11. The arrangement is such that when there is no drill in position between the jaws 21 the sleeve 18 can be given a complete rotation about the head 11, the blocks or runners 25 being adapted to pass directly through the longitudinally-extending groove sections 24 from the high portions of the cams to the low portions. As the sleeve 18 and the cage 20 are rotated relative to the head 11, the socket member 12 normally rotates with such parts by reason of the provision of the anti-friction bearing, as above described, whereby the wear upon the outer edges of the jaws 21 is reduced to a minimum.

With a drill in position between the jaws 21, which have been tightened thereon by an appropriate turning of the sleeve 18, when the shank 10 is rotated in the direction in which the drill must be driven, motion is transmitted from the shank 10 through the head 11 to the sleeve 18 and the cage 20 which carries the jaws 21 in the socket member 12 in the same direction. Motion is transmitted from the head 11 to the sleeve 18 through the medium of the cam blocks or runners 25 which engage the cam groove 23 for positive driving when the jaws 21 have been moved into tight engagement with the drill. By reason of the fact that the rotation of the head 11 in the operation of the drill is constantly in the direction in which said head must move relative to the sleeve 18 for tightening a drill in position, there is no danger at any time of the sleeve 18 rotating in the opposite direction relative to the head 11 so as to inadvertently loosen the drill in the chuck.

In the drawings I have shown a drill 27 in position in the jaws 21. Whenever it is desired to remove the drill 27 and substitute another drill, this will be accomplished by turning the sleeve 18 in the direction for carrying the cam blocks or runners 25 toward the left in Fig. 3, serving thus to carry also the sleeve 18, the cage 20 and the jaws 21 in the same direction for loosening the jaws relative to the drill. If another drill of approximately the same size is to be inserted, a very slight movement of the sleeve 18 is sufficient for the removal of the one drill and the clamping of the substitute drill in position, because after loosening the drill already in the chuck by turning said sleeve to a slight extent in the appropriate direction, such drill may be removed and then the sleeve may be immediately moved to the outer extremity of its longitudinal movement to fully open the jaws 21 by rotating it in one direction or the other, depending upon which is the quicker way. For example, in the construction shown in Fig. 3, if after the removal of the drill the cam blocks 25 are near the inner ends of the longitudinally extending sections 24, of the cam groove 23, which is the case when a comparatively small drill has been used, the chuck may be quickly opened to receive a large drill by turning the sleeve 18 in a counterclockwise direction as viewed in Fig. 2, as in that way the cam blocks are moved to the inner ends of said sections 24 and may then be moved immediately to the outer ends of said sections. If, however, the cam blocks 25 are nearer the inner ends of said sections 24, which is the case when a comparatively large drill has been used, the sleeve 18 is turned in a clockwise direction as viewed in Fig. 2, thereby opening the chuck to its widest extent to receive a new drill. It will be seen, therefore, that in the construction referred to at most a quarter turn of the sleeve 18 is sufficient to open the chuck to its widest extent after the removal of a drill. In case a small drill is to be substituted for a large one, or vice versa, the operation of making the change requires at the most only about a quarter of a single revolution of the sleeve 18 relative to the head 11.

In the construction shown in Fig. 7, a head 28 is fixedly mounted upon the shank 29, the head 28 being provided with a cam groove similar to the cam groove 23 except that the cam groove 30 extends entirely about the periphery of the head 28 in a gradual rise rather than merely half way about the head. In other words, the cam groove 30 comprises only a single longitudinally-extending portion 31 in lieu of the two longitudinally-extending portions 24 of the cam groove 23. The remaining parts of the construction to be used with the device shown in Fig. 7 are the same as that already described except that in the construction of Fig. 7 only one of the blocks or runners 25 would be used in lieu of the two blocks or runners 25 of the construction shown in Figs. 1 to 6. In view of the similarity of construction, it is believed to be unnecessary to further illustrate or describe the modified form shown in Fig. 7. In this construction at most a half turn of the sleeve 18 is necessary to fully open the jaws of the chuck.

The construction and arrangement of my improved chuck are such that when in position upon a machine drill the sleeve 18 remains normally at its lower-most position when there is no drill in the chuck, the sleeve being adapted to descend of its own weight when a drill is removed. When the shank of the drill is in position, however, between the jaws 21, with the sleeve 18 turned so as to cause the socket member 12 to be moderately tight upon the outer faces of the jaws 21, the parts are automatically held against any change of position to the extent necessary for preventing a loosening of the jaws under any normal circumstances, the drill being held very firmly against turning relative to the chuck.

By the use of a socket which flares downwardly or outwardly away from the shank, I have provided a construction in which the size of the drill to be inserted is not limited by the size of the opening at the smaller end of the socket. In the use of my improved construction and arrangement, on the contrary, I am enabled to provide an opening for the reception of a drill of such size as may be desired limited merely by the possible spread of the jaws at the larger end of the socket independently of the size of the opening at the smaller end of the socket, thereby increasing the range of sizes of drills which may be used in the same chuck.

While I have shown a combination in which the socket member 12 is revoluble relative to the head 11, it will be understood that I do not wish to limit myself to this particular construction except as hereinafter specifically claimed, and my claims are to be construed accordingly.

That which I claim as my invention, and desire to secure by Letters Patent, is,—

1. In a drill chuck, the combination of a plurality of jaws, means for holding said jaws movably in position for adjustment toward and from each other, and means comprising a grip member adapted to tighten said jaws together when turned in one direction and adapted by a subsequent abrupt movement longitudinally to loosen said jaws.

2. In a drill chuck, the combination of a plurality of jaws, means for holding said jaws movably in position for adjustment toward and from each other, and means comprising a grip member adapted by a partial rotation to tighten said jaws together and adapted by intermediate longitudinal movement to loosen said jaws.

3. In a drill chuck, the combination of a plurality of jaws, means for holding said jaws movably in position for adjustment toward and from each other, and means comprising a grip member adapted by successive partial rotations to tighten said jaws together and adapted by intermediate longitudinal movements to loosen said jaws.

4. In a drill chuck, the combination of a head, a plurality of jaws movable relative to said head for adjustment toward and from each other, a sleeve revolubly and slidably mounted relative to said head, connections between said head and said sleeve adapted to cause the sleeve to move longitudinally when given a partial rotation and adapted at a certain point to permit longitudinal movement of the sleeve independently of any substantial rotary movement, and means adapted upon longitudinal movement of the sleeve in one direction to move said jaws toward each other.

5. In a drill chuck, the combination of a head member, a plurality of jaws movable relative to said head member for adjustment toward and from each other, a sleeve member revolubly and slidably mounted on said head member, means adapted upon longitudinal movement of the sleeve in one direction to move said jaws toward each other, and a cam block carried by one of said members adapted by engagement with a suitable cam groove in the other of said members to cause said sleeve member to move longitudinally upon a rotary movement of the sleeve member and adapted at a certain point to permit the sleeve to move longitudinally independently of any substantial rotary movement.

6. In a drill chuck, the combination of a plurality of jaws, means for holding said jaws movably in position for adjustment toward and from each other, and means comprising a rotary grip member adapted by a single complete rotation to move said jaws a plurality of times through the limits of their adjustment relative to each other.

7. In a drill chuck, the combination of a socket member flaring outwardly toward its outer end, a cage extending into said socket member from its outer end, a plurality of jaws adjustably mounted in said cage and movable longitudinally therewith, and means rotatable to move said cage and said socket member longitudinally relative to each other and being capable also of longitudinal movement independently of its rotary movement to adjust the jaws toward and from each other.

8. In a drill chuck, the combination of a head, comprising a socket member held against longitudinal movement relative thereto, a cage extending into said socket member from its outer end, a plurality of jaws adjustably mounted in said cage and movable longitudinally therewith, and means rotatable to move said cage longitudinally relative to said socket member and being capable also of longitudinal movement independently of its rotary movement for adjusting said jaws toward and from each other.

9. A drill chuck comprising a socket member, a cage movable longitudinally within said socket member, a plurality of jaws mounted in said cage adapted to move longitudinally therewith and to move radially relative thereto, said jaws having diagonally-disposed bearings at their outer edges upon said socket member, and means rotatable to move said cage longitudinally of said socket member and being capable also of longitudinal movement independently of its rotary movement for moving said cage longitudinally.

10. In a drill chuck, the combination of a head comprising a socket member revolubly mounted relative thereto, a plurality of jaws having diagonally-disposed bearings in said socket member, and means rotatable to move said jaws longitudinally in unison relative to said socket member and being movable longitudinally independently of its rotation to move the jaws toward and from each other along said diagonal bearings.

11. In a drill chuck, the combination of a head, comprising a socket member, a second member relative to which said socket member is revolubly mounted, and anti-friction means interposed between said members, a plurality of jaws having diagonally-disposed bearings in said socket member, and means rotatable to move said jaws longitudinally in unison relative to said socket member and being capable of moving longitudinally independently of its rotation to move the jaws toward and from each other along said diagonal bearings.

12. A drill chuck comprising a socket member, a sleeve revolubly mounted relative to said socket member and adapted to move longitudinally of said socket member independently of rotation, a cage connected with said sleeve and extending into said socket member, a plurality of jaws mounted in said cage adapted to move longitudinally therewith and to move radially relative thereto, said jaws having diagonally-disposed bearings at their outer edges upon said socket member, and means whereby said sleeve when rotated will be caused to move longitudinally relative to said socket member.

13. In a drill chuck, the combination of a head comprising a socket member revolubly mounted relative thereto, a sleeve revolubly mounted relative to said head and also adapted to move longitudinally of said head, a cage connected with said sleeve and extending into said socket member, a plurality of jaws mounted in said cage adapted to move longitudinally therewith and to move radially relative thereto, said jaws having diagonally-disposed bearings at their outer edges upon said socket member, and connections between said sleeve and said head adapted to cause the sleeve to move longitudinally for moving said jaws toward each other when given a rotary movement relative to the head and adapted at a certain point in its rotation to permit longitudinal movement of the sleeve independently of rotary movement.

14. In a drill chuck, the combination of a head comprising a socket member revolubly monted relative thereto, a sleeve revolubly mounted relative to said head and also adapted to move longitudinally of said head, a cage connected with said sleeve and extending into said socket member, a plurality of jaws mounted in said cage adapted to move longitudinally therewith and to move radially relative thereto, said jaws having diagonally-disposed bearings at their outer edges upon said socket member, and a cam-block carried by said sleeve adapted by engagement with a suitable cam groove in the outer face of said head to cause said sleeve to move longitudinally upon a rotary movement of the sleeve and adapted at a certain point to permit the sleeve to move longitudinally independently of rotary movement.

CARL A. PALMGREN.

Copies of this patent may be obtained for five cents each, by addressing the "Commissioner of Patents, Washington, D. C."